(12) United States Patent
Seshia et al.

(10) Patent No.: US 9,310,391 B2
(45) Date of Patent: Apr. 12, 2016

(54) DUAL AND TRIPLE AXIS INERTIAL SENSORS AND METHODS OF INERTIAL SENSING

(71) Applicant: CAMBRIDGE ENTERPRISE LIMITED, Cambridge (GB)

(72) Inventors: Ashwin Arunkumar Seshia, Cambridge (GB); Pradyumna Thiruvenkatanathan, Middlesex (GB); Xudong Zou, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 14/426,097

(22) PCT Filed: Sep. 4, 2013

(86) PCT No.: PCT/GB2013/000375
§ 371 (c)(1),
(2) Date: Mar. 4, 2015

(87) PCT Pub. No.: WO2014/037695
PCT Pub. Date: Mar. 13, 2014

(65) Prior Publication Data
US 2015/0226762 A1 Aug. 13, 2015

(30) Foreign Application Priority Data

Sep. 4, 2012 (GB) .................................. 1215750.9

(51) Int. Cl.
*G01K 11/26* (2006.01)
*G01P 15/18* (2013.01)
(Continued)

(52) U.S. Cl.
CPC . *G01P 1/006* (2013.01); *G01K 7/32* (2013.01); *G01K 11/26* (2013.01); *G01P 15/097* (2013.01); *G01P 15/18* (2013.01); *G01P 2015/084* (2013.01)

(58) Field of Classification Search
CPC ................................ G01K 11/26; G01P 15/18

USPC ........................................................... 73/495
See application file for complete search history.

(56) References Cited

U.S. PATENT DOCUMENTS

| 4,851,080 A | 7/1989 | Howe et al. |
| 4,901,570 A | 2/1990 | Chang et al. |

(Continued)

FOREIGN PATENT DOCUMENTS

| CN | 102590555 A | 7/2012 |
| JP | 2000180466 A | 6/2000 |

(Continued)

OTHER PUBLICATIONS

Int. J Adv Eng Sct Appl Math, 2010, vol. 2, No. 102, p. 35-43.
(Continued)

*Primary Examiner* — Lisa Caputo
*Assistant Examiner* — Jamel Williams
(74) *Attorney, Agent, or Firm* — John B. Hardaway, III; Nexsen Pruet, LLC

(57) ABSTRACT

An inertial sensor comprising: a frame; a proof mass suspended from the frame; a pair of first resonant elements electrically coupled to the proof mass, or to an intermediate component mechanically coupled to the proof mass, each first resonant element coupled to an opposite side of the proof mass to the other, the first resonant elements being substantially identical to one another and having substantially identical electrostatic coupling with the proof mass when the sensor is not accelerating; wherein the first resonant elements and proof mass lie substantially in a plane, and wherein movement of the proof mass relative to the first resonant elements orthogonal to the plane alters the electrostatic coupling between the proof mass and the first resonant elements; drive means coupled to the first resonant elements for vibrating each of the first resonant elements; and a sensor assembly for detecting a shift in the resonant frequency of each of the first resonant elements; and processing means for summing the shifts of each of the first resonant elements to provide a measure of acceleration of the proof mass parallel to a first axis, the first axis being orthogonal to the plane.

20 Claims, 6 Drawing Sheets

(51) Int. Cl.
*G01P 1/00* (2006.01)
*G01P 15/097* (2006.01)
*G01K 7/32* (2006.01)
*G01P 15/08* (2006.01)

(56) References Cited

U.S. PATENT DOCUMENTS

| | | | |
|---|---|---|---|
| 5,261,277 | A | 11/1993 | Thomas et al. |
| 7,119,550 | B2 | 10/2006 | Kitano et al. |
| 7,578,189 | B1 | 8/2009 | Mehreganv |
| 7,849,742 | B2 | 12/2010 | Wang et al. |
| 2002/0194926 | A1 | 12/2002 | Awtar et al. |
| 2004/0025590 | A1 | 2/2004 | Schaad |
| 2010/0223996 | A1 | 9/2010 | Fukumoto |
| 2010/0301433 | A1 | 12/2010 | Wu et al. |
| 2011/0056294 | A1 | 3/2011 | Simoni |
| 2011/0234206 | A1 | 9/2011 | Kawakubo |
| 2011/0265564 | A1 | 11/2011 | Acar |
| 2011/0290023 | A1 | 12/2011 | Takage |
| 2012/0132003 | A1 | 5/2012 | Comi |
| 2014/0305208 | A1* | 10/2014 | Thiruvenkatan-athan ............ G01C 19/5719 73/504.12 |

FOREIGN PATENT DOCUMENTS

| | | |
|---|---|---|
| JP | 2000206141 A | 7/2000 |
| WO | WO8910567 | 11/1989 |
| WO | WO9010237 | 9/1990 |
| WO | 9745702 A1 | 11/2005 |
| WO | 2010019278 A1 | 9/2011 |

OTHER PUBLICATIONS

Mico & Nano Letters, 2011, vol. 6, Iss.7, p. 519-522.
P68277.W001 PCT IPRP Dated Oct. 3, 2015.

\* cited by examiner

DUAL AND TRIPLE AXIS INERTIAL SENSORS AND METHODS OF INERTIAL SENSING

FIELD OF THE INVENTION

The present invention relates to inertial sensors and methods of inertial sensing using microscopic mechanical inertial sensors. In particular, the invention relates to inertial sensors that can be readily manufactured and are capable of sensing in two or three orthogonal directions using only a single suspended proof mass.

BACKGROUND TO THE INVENTION

Oscillators based on lightly damped microscopic mechanical resonators are well known for their ability to produce stable, low-noise frequency outputs. While these characteristics make them valuable in communication systems as stable timing frequency references, they also make them attractive for use as sensors. A resonant sensor, by definition, is an oscillator whose output frequency is a function of an input measurand. In other words, the output of a resonant sensor corresponds to the shift in resonant frequency of a mechanical microstructure that gets tuned in accordance to a change in a physical chemical quantity to be measured. The quasi-digital nature of the output signal in such sensors, along with the high sensitivity and stability of the frequency shifted output signals, have resulted in wide spread use of such micromachined resonant sensors for numerous applications ranging from bio-molecular and chemical diagnostics, to high-precision force, mass, strain and even charge sensing.

As a particular case of resonant sensors, there has been an increased interest over the past few years in the development of high precision micromachined 'all-silicon' resonant microaccelerometers. See for example: U.S. Pat. No. 5,969,249; U.S. Pat. No. 4,851,080; US20110056294; CN101303365. This interest has been triggered due to the recent growth in demand for miniature high precision motion sensors within the aerospace, automotive and even the consumer-electronics markets. Resonant microaccelerometers fabricated using silicon micromachining techniques present a number of significant advantages, the biggest being economy. These silicon resonant microaccelerometers not only boast improved sensitivity and resolution relative to their more traditional capacitive detection based counterparts with similar device footprints, but have also been shown to provide enhanced dynamic range making them ideal candidates for potential application in numerous motion sensing applications within the identified markets.

However, most of these sensors still remain uniaxial or biaxial, consequently restricting their functionality and practical applicability to those applications that do not demand sophisticated three dimensional (3D) motion control. Whilst three uniaxial, orthogonally oriented resonant microaccelerometers could potentially be employed for a precise three dimensional frequency shifted acceleration motion read out, such implementations correspondingly increase the cost, size and power requirements of the device.

It is an object of the present invention to provide a micromachined silicon resonant accelerometer that allows for two and three dimensional acceleration read out using only a single suspended proof mass.

SUMMARY OF THE INVENTION

The invention is defined in the appended independent claims, to which reference should be made. Optional features are set out in the dependent claims.

In a first aspect of the invention, there is provided an inertial sensor comprising:

a frame;

a proof mass suspended from the frame;

a pair of first resonant elements electrically coupled to the proof mass, or to an intermediate component mechanically coupled to the proof mass, each first resonant element coupled to an opposite side of the proof mass to the other, the first resonant elements being substantially identical to one another and having substantially identical electrostatic coupling with the proof mass when the sensor is not accelerating;

wherein the first resonant elements and proof mass lie substantially in a plane, and wherein movement of the proof mass relative to the first resonant elements orthogonal to the plane alters the electrostatic coupling between the proof mass and the first resonant elements;

drive means coupled to the first resonant elements for vibrating each of the first resonant elements; and a sensor assembly for detecting a shift in the resonant frequency of each of the first resonant elements; and processing means for summing the shifts of each of the first resonant elements to provide a measure of acceleration of the proof mass parallel to a first axis, the first axis being orthogonal to the plane.

Any change in the electrostatic coupling between the proof mass a resonant element results in a change in the effective stiffness of that resonant element, which changes the resonant frequency of the resonant element. In this context, "detecting a shift in the resonant frequency" should be understood to include both directly detecting a shift in the resonant frequency and indirectly detecting a shift in resonant frequency by detecting a change in another aspect of the resonant response of the resonant element.

Summing the resonant frequency shifts removes any contribution from in plane movement of the proof mass towards or away from the resonant elements, so that out-of-plane acceleration can be decoupled and determined. As each of the first resonant elements are mounted on opposite sides of the proof mass any in plane movement will result in a shift of equal magnitude but opposite direction on each resonant element. Preferably, the proof mass and resonant elements are configured such that movement of the proof mass tangential to the first resonant elements does not alter the electrostatic coupling. For example, the sides of the proof mass to which the first resonant elements are coupled may have uniform thickness and extend parallel to the tangential direction, beyond the first resonant elements in the tangential direction.

Any suitable resonant elements may be used, such as double ended tuning fork resonators.

The sensor may further comprise a second resonant element coupled to the proof mass, the second resonant element configured to allow for detection of acceleration parallel to a second axis, orthogonal to the first axis; wherein the drive means is coupled to the second resonant element for vibrating the second resonant element, and the sensor assembly detects a shift in the resonant frequency of the second resonant element. The second resonant element is preferably mechanically coupled to the proof mass.

The inertial sensor may further comprise a third resonant element coupled to the proof mass, the third resonant element configured to allow for detection of acceleration parallel to a third axis, wherein the third axis is orthogonal to the first axis and the second axis;

wherein the drive means is coupled to the third resonant element for vibrating the third resonant element, and the sensor assembly detects a shift in the resonant frequency of the third resonant element. The third resonant element is preferably mechanically coupled to the proof mass.

The second and third resonant elements allow for in-plane acceleration of the proof mass to be measured. The combination of first second and third resonant elements provides a triple axis accelerometer using only a single suspended proof mass.

The sensor may comprise a pair of third resonant elements each third resonant element positioned on an opposite side of the proof mass to the other, the third resonant elements being identical to one another, and a pair of second resonant elements each second resonant element positioned on an opposite side of the proof mass to the other, the second resonant elements being identical to one another. By providing identical pairs of resonant elements a differential read out can be used so that frequency fluctuations resulting from environmental factors, such as temperature and pressure variations, can be eliminated from the in-plane acceleration measurement.

In addition, a common mode read out from one or both pairs of second and third resonant elements can provide an output that is indicative of temperature with a rejection of first order variations in frequency due to acceleration. By taking both the sum (common mode) and difference (differential) read-outs, a multi-parameter sensor is provided. The ability to determine temperature, or changes in temperature, is of interest in many applications in which accelerometers are used. The temperature measurement may also be used in combination with the acceleration read-out to provide a more accurate determination of acceleration. The relationship between resonant frequency and temperature may have second or higher order terms and the temperature measurement can be used to calculate any second order or higher order terms, which are then taken into account when calculating acceleration from the detected resonant frequency shifts.

The inertial sensor may further comprise a mechanical stage between the proof mass and the frame, the mechanical stage configured to decouple movement of the proof mass in two orthogonal directions in the plane, wherein the second or third resonant elements, or both the second and third resonant elements, are mechanically coupled to the mechanical stage. This allows for reduced cross-axis sensitivity and in consequence, simpler processing of the outputs from the sensor.

The inertial sensor may further comprise a fourth resonant element, wherein the fourth resonant element is substantially identical to the first resonant elements and is not electrically coupled to the proof mass. The fourth resonant element, or a pair of fourth resonant elements, may be used to provide a differential read out with the first pair of resonant elements, to eliminate environmental factors, such as temperature and pressure, from the measurement of out-of-plane acceleration.

The inertial sensor may further comprise at least one amplifying lever coupled between the proof mass or mechanical stage and one of the first, second and third resonant elements. The amplifying lever is designed to be a force amplifier when coupled to the second and third resonant elements in order to amplify the inertial force communicated to the resonant elements for a given induced acceleration, and in consequence increase the scale factor of the device. The frame, proof mass and resonant elements may all be formed from machined silicon.

The invention provides a micromachined silicon resonant accelerometer that offers the primary advantages of improved sensitivity and dynamic range as in the case of most resonant accelerometers reported to date, but also allows for a three dimensional frequency-shifted acceleration read out, with enhanced cross-axis rejection, using only a single suspended proof mass. Such an implementation allows for a reduction in the manufacturing costs of such sensors, and also allows for a reduction in the size and consequently, the footprint of the device another key determinant of deployment costs in numerous applications, especially within consumer electronics.

In another aspect, the invention provides a method of measuring out-of-plane acceleration using a micro-machined planar inertial sensor, the inertial sensor comprising: a frame; a proof mass suspended from the frame; a pair of first resonant elements electrically coupled to the proof mass, each first resonant element coupled to an opposite side of the proof mass to the other, the first resonant elements being substantially identical to one another and having substantially identical electrostatic coupling with the proof mass when the sensor is not accelerating; wherein the first resonant elements and proof mass lie substantially in a plane, and wherein movement of the proof mass relative to the first resonant elements orthogonal to the plane alters the electrostatic coupling between the proof mass and the first resonant elements; and drive means coupled to the first resonant elements for vibrating each of the first resonant elements; the method comprising:

detecting a shift in the resonant frequency of each of the first resonant elements; and summing the shifts of each of the first resonant elements to provide a measure of acceleration of the proof mass parallel to a first axis, the first axis being orthogonal to the plane.

In a further aspect, the invention provides an inertial sensor comprising:

a frame;

a mechanical stage suspended from the frame, a proof mass suspended from the mechanical stage, the mechanical stage operative to decouple movement of the proof mass in two orthogonal directions;

a first resonant element coupled to a first portion of the mechanical stage, the first portion of the mechanical stage free to move parallel to a first axis;

a second resonant element coupled to a second portion of the mechanical stage, the second portion of the mechanical stage free to move parallel to a second axis, the second axis being orthogonal to the first axis;

drive means coupled to the resonant elements for vibrating each of the resonant elements; and a sensor assembly for detecting a shift in the resonant frequency of each of the first and second resonant elements.

The combination of a stage that decouples X and Y axis motion of the proof mass with resonant sensing of acceleration provides an inexpensive, effective and accurate dual axis accelerometer using only a single suspended proof mass.

The inertial sensor may further comprise at least one amplifying lever, such as a mechanical force amplifying lever, coupled between the mechanical stage and one of the first and second resonant elements.

The inertial sensor may comprise a pair of first resonant elements, each of the first resonant elements disposed on opposite sides of the mechanical stage and being substantially identical to one another. The inertial sensor may comprise a pair of second resonant elements, each of the second resonant elements disposed on opposite sides of the mechanical stage and being substantially identical to one another. By providing identical pairs of resonant elements a differential read out can be used so that frequency fluctuations resulting from environmental factors, such as temperature and pressure variations, can be eliminated from the in-plane acceleration measurement. In addition, a common mode read out from one or both pairs of second and third resonant elements can provide an output that is indicative of temperature, with a rejection of first order variations in frequency due to acceleration. By taking both the sum (common mode) and difference (differential) read-outs, a multi-parameter sensor is provided.

The inertial sensor may further include at least one third resonant element electrostatically coupled to the proof mass or mechanical stage, wherein acceleration of the proof mass in a direction orthogonal to the first and second axes alters the electrostatic coupling between the third resonant element and the proof mass or mechanical stage. Any alteration to the electrostatic coupling resulting from acceleration along the first or second axes may be calculated from the signal resulting from the first and second resonant elements, or may be cancelled using a pair of oppositely mounted third resonant elements, in accordance with the first aspect of the invention.

The frame, proof mass and resonant elements may all be formed from machined silicon.

In a further aspect of the invention, there is provided an inertial sensor comprising:
a frame;
a proof mass suspended from the frame;
a pair of first resonant elements coupled to the proof mass, or to an intermediate component coupled to the proof mass, each first resonant element coupled to an opposite side of the proof mass to the other, the first resonant elements being substantially identical to one another and having substantially identical coupling with the proof mass when the sensor is not accelerating;
wherein movement of the proof mass toward or away from the first resonant elements alters the effective stiffness of the first resonant elements;
drive means coupled to the first resonant elements for vibrating each of the first resonant elements;
a sensor assembly for detecting a shift in the resonant frequency or effective stiffness of each of the first resonant elements; and
processing means for summing the shifts of each of the first resonant elements to provide a measure of temperature.

The processing means may be configured to provide a difference between the shifts of each of the first resonant elements to provide a measure of acceleration in one direction. Preferably, the proof mass and resonant elements are configured such that movement of the proof mass tangential to the first resonant elements does not alter the electrostatic coupling.

The processing means may comprise a mixer having an input connected to the sensor assembly and an output connected to a first filter and a second filter, the first filter configured to provide an output that is a sum of the shifts of each of the first resonant elements to provide the measure of temperature, the second filter configured to provide an output that is a difference between the shifts of each of the first resonant elements to provide the measure of acceleration in one direction.

In a still further aspect of the invention, there is provided a method of measuring acceleration and temperature using a single inertial sensor, the inertial sensor comprising: a frame; a proof mass suspended from the frame; a pair of first resonant elements coupled to the proof mass, or to an intermediate component coupled to the proof mass, each first resonant element coupled to an opposite side of the proof mass to the other, the first resonant elements being substantially identical to one another and having substantially identical coupling with the proof mass when the sensor is not accelerating; wherein movement of the proof mass towards or away from the first resonant elements alters the effective stiffness of the first resonant elements; drive means coupled to the first resonant elements for vibrating each of the first resonant elements; and a sensor assembly for detecting a shift in the resonant frequency of each of the first resonant elements, the method comprising the steps of:
summing the shifts in the resonant frequency shifts of the first resonant elements to provide a measure of temperature; and
calculating a difference in the resonant frequency shifts of the first resonant elements to provide a measure of acceleration.

It should be clear that features described in relation to one aspect of the invention may equally be used in other aspects of the invention.

BRIEF DESCRIPTION OF THE DRAWINGS

Embodiments of the present invention will now be described, by way of example only, with reference to the accompanying drawings, in which.

DETAILED DESCRIPTION

Figure 1:
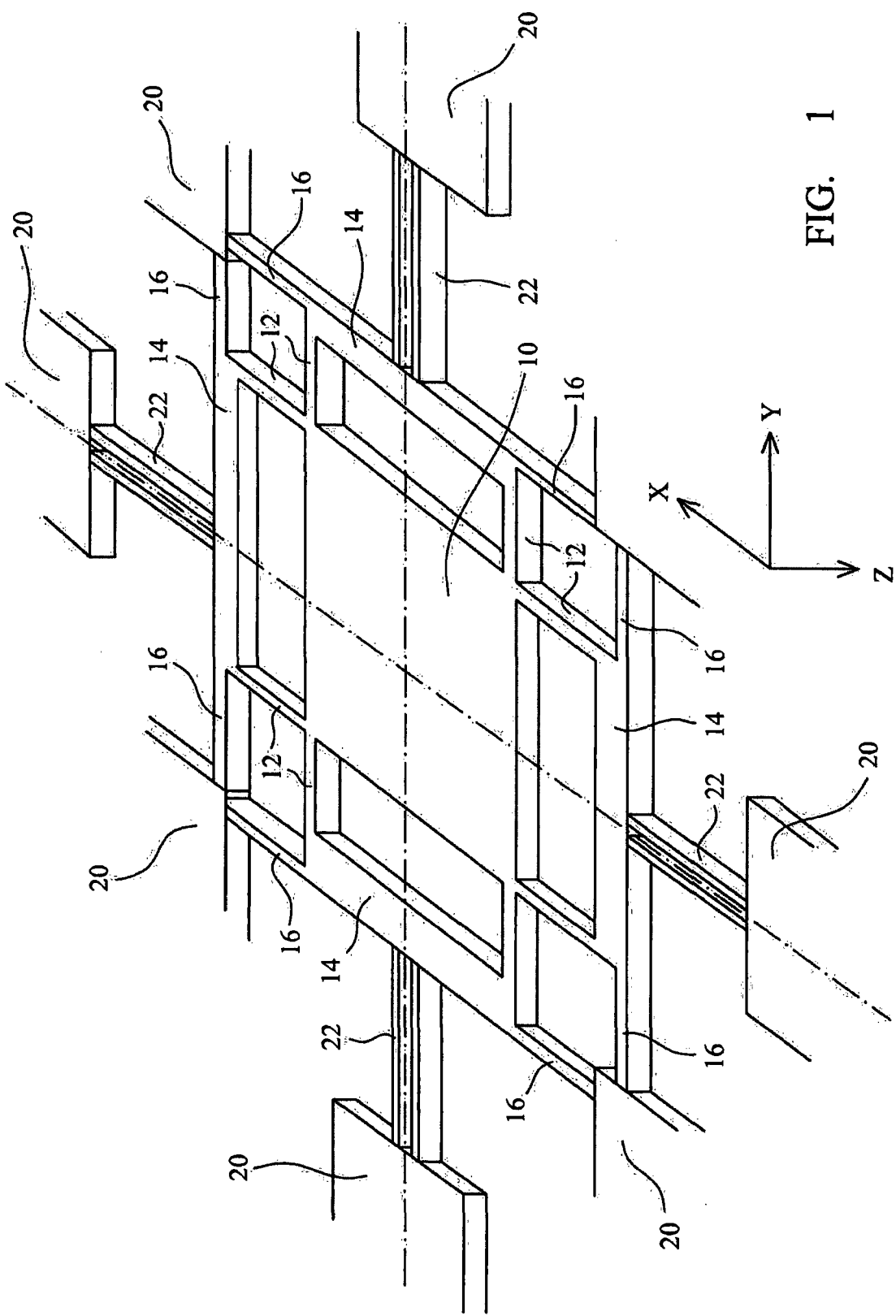
FIG. 1 is a schematic perspective view of a dual axis accelerometer in accordance with the invention.

FIG. 1 is a schematic illustration of a dual axis inertial sensor in accordance with an embodiment of the invention. The sensor comprises a single suspended silicon proof mass held within a dual-axis stage. The dual-axis stage comprises four platforms 14 that are coupled to the proof mass 10 at each corner of the proof mass, by flexures 12. The platforms 14 are coupled to a surrounding frame 20 by flexures 16. The stage is designed in such a way that it allows for decoupled, but symmetric motion of the suspended proof mass in both the X and Y axes, with reduced mechanical cross-talk between the two axes. The stage is designed to restrict the motion of the platforms 14 to one degree of freedom, i.e. along the X or Y axis as shown, while allowing the proof mass suspended within the stage to displace with two degrees of freedom, i.e. along both X and Y axes. This allows decoupled outputs to be connected to the platforms 14 to transduce the acceleration of the proof mass in each of the two orthogonal axes. The suspension flexures 12, 16 are designed to be structurally identical along both the X and Y axis to render an equal effective stiffness along both axes. This symmetry reduces mechanical cross-talk between the X and Y axes, and also allows for identical dual-axis sensitivity. The sensor of FIG. 1 is advantageously fabricated entirely from a single semiconductor wafer, such as a silicon-on-insulator (SOI) wafer and can be fabricated using conventional MEMS fabrication techniques, such as surface micromachining and etching.

The platforms 14 are each mechanically coupled to vibratory double ended tuning fork resonators 22. Each resonator 22 is oriented perpendicular to the platform 14 to which it is connected. The acceleration of the proof mass results in strain on the resonators, altering their resonant frequency. The X and Y accelerations are decoupled by the stage to provide separate X and Y outputs.

In the embodiment illustrated in FIG. 1, identical resonators 22 are attached at diametrically opposite sides of the proof mass 10, along the two in-plane axes of sensitivity (illustrated by dotted lines in FIG. 1). Any motion of the proof mass consequently gets translated into an equal magnitude of strain on each of the oppositely positioned resonators, but of opposite polarity. In other words, one resonator undergoes an axial tensile stress while the other undergoes an axial compressive stress. Consequently, the induced strain on each of the tuning fork resonators results in a shift of their resonant frequency by an equal magnitude but in an opposite direction. A differential measurement from the two diametrically opposed resonators can then be used to provide for a first order common mode cancellation of any frequency fluctuations arising from environmental variations, such as temperature and pressure fluctuations. A more detailed description of the electrical processing of the outputs from the resonators is provided with reference to FIG. 4.

FIG. 1 is just one example of a mechanical stage design that can be used in conjunction with the resonators in accordance with the invention. Any appropriate flexure based mechanical stage may be used in accordance with the present invention if it effectively decouples the motion of the proof mass along two orthogonal axes.

Different resonator topologies may be used in place of the double ended tuning fork resonators shown in FIG. 1. Any suitable resonant elements providing an output indicative of acceleration of the proof mass, based on a change in the resonant behaviour of the resonant elements may be used.

Figure 2:
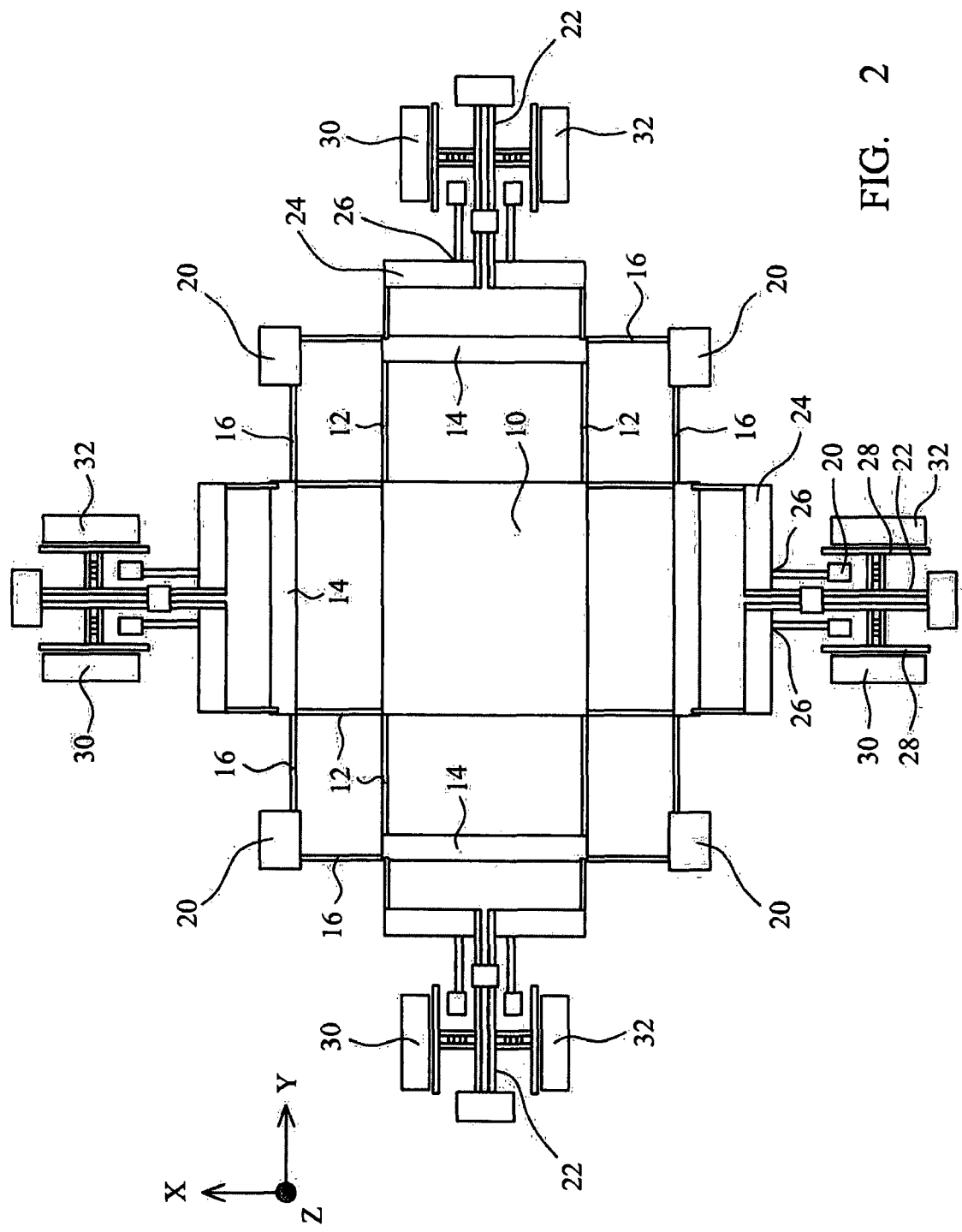
FIG. 2 is a plan, schematic view of a dual axis accelerometer of the type shown in FIG. 1, additionally incorporating force amplification microlevers and illustrating drive and sense electrodes.

Additionally, force amplification levers can be coupled between the stage and the resonators to magnify the applied strain on the resonators. FIG. 2 is a schematic plan view of a dual-axis sensor of the type shown in FIG. 1, with force amplifying levers positioned between the platforms 14 and the resonators 22. FIG. 2 also illustrates the drive and sense electrodes used to drive the resonators and sense an output.

The microlevers 24 are positioned between the platforms 14 and the resonant elements 22 and pivot about fulcrums 26. Each fulcrum 26 is positioned so as to amplify the strain on the resonant element 22. Levers of this type are described in greater detail in U.S. Pat. No. 5,969,249, the contents of which are incorporated herein by reference.

FIG. 2 also shows that each of the resonant elements includes a pair of coupling electrodes 28. Drive and sense electrodes 30, 32 are positioned adjacent the coupling electrodes 28. A drive signal can be applied to each resonant element through drive electrode 30 and an output signal sensed by sense electrode 32. This arrangement is shown in more detail in FIG. 4. Alternately, additional transduction electrodes may be positioned to allow for improved transduction of the resonant elements.

Figure 3:
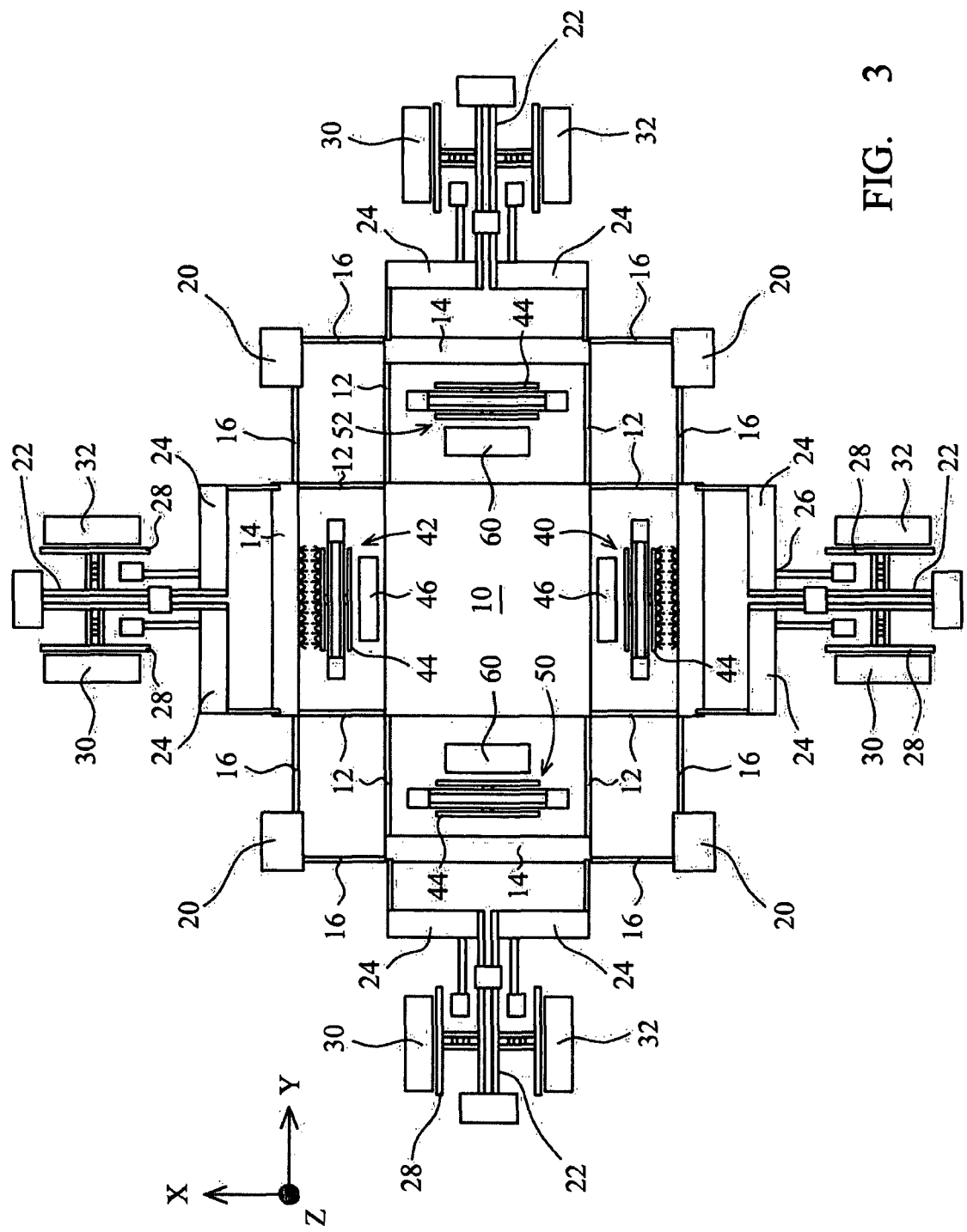
FIG. 3 is a schematic plan view of a triple axis accelerometer in accordance with the invention.

The dual-axis accelerometer shown in FIGS. 1 and 2 can be used as part of a triple axis accelerometer design, as shown in FIG. 3. In FIG. 3, the same reference numerals are used to indicate elements identical to those shown in FIG. 2. The embodiment illustrated in FIG. 3 incorporates two additional pairs of mechanically identical tuning fork resonators 40 and 42 and 50 and 52. Each of the first resonators 40, 42 is electrostatically coupled to the platform 14 at diametrically opposite positions. The first resonators include capacitive coupling plates 44 to capacitively couple to both the platforms 14 (shown by the dotted arrows) and to the drive electrodes 46. As an alternative to the configuration shown in FIG. 3, the resonators, 40, 42 could be electrostatically coupled to the proof mass rather than to the platform 14. The other pair of resonators, 50, 52 is not electrically coupled to the proof mass or the stage 14 as the same DC voltage is applied to resonators 50, 52 and to the proof mass and platform. The resonators 50, 52 have an identical construction to the first pair of resonators 40, 42 including capacitive coupling plates, and are positioned close to the first pair of resonators 40, 42 so that they are subject to substantially the same environmental conditions. In the example shown in FIG. 3 they are positioned between the platform 14 and the proof mass 10, in a similar manner to the first pair of resonators 40, 42.

Any induced acceleration of the proof mass along the Z axis will displace the proof mass and accordingly the platforms 14, by a distance, the magnitude of which is dependent on the stiffness offered by the stage along the Z axis. Any Z axis displacement of the proof mass or platforms 14 changes the capacitive area between the first pair of resonators 40, 42 and the platforms 14, resulting in a variation in their resonant frequencies of operation. The magnitude of the change in resonant frequency is dependent on the change in the capacitive coupling area. The electrically decoupled pair of resonators 50, 52 experiences no frequency variation as a result of displacement of the proof mass along the Z axis. The decoupled pair of resonators 50, 52 can be used to cancel any variation in resonant frequency that is due to environmental factors, such as variations in temperature and pressure.

By measuring the sum of frequency changes experienced by the coupled resonators, 40 and 42, and then performing a differential calculation with the summed output of the resonators 50 and 52, a direct measure of the displacement of the stage along the Z axis may be obtained, which can be used to determine the acceleration along the Z axis. Simultaneous measurements of the variations in the parallel plate capacitor formed between the proof mass and the substrate silicon layer could be used to provide the acceleration polarity. Alternative mechanical arrangements like comb drive based capacitive z-axis acceleration detection techniques may be used in conjunction with the resonant readout mechanism to provide polarity information in case specific fabrication processes where the underlying substrate is etched.

Of course, any displacement along the X axis also results in a capacitive gap modulation between the coupled resonant elements 40, 42 and the platform 14. However, as long as the capacitive coupling gaps are designed to be identical, any fluctuation in frequency arising from a movement of the stage along the X axis will be of the same magnitude but opposite polarity for the resonant elements 40 and 42. Accordingly, summing the outputs of the resonators 40 and 42, results in a cancellation of any variation as a result of movement in the X axis. So, unlike the direct differential measurement of the resonant frequencies of the axially coupled resonators for monitoring acceleration along the X and Y axes, the Z axis measurement is obtained by monitoring the summed output of the resonant frequency shifts of the electrically coupled resonators 40 and 42. Subtracting any frequency changes obtained from the sum of the signals from the uncoupled resonators 50 and 52 can then be used to correct for any unwanted environmental factors.

Figure 4:
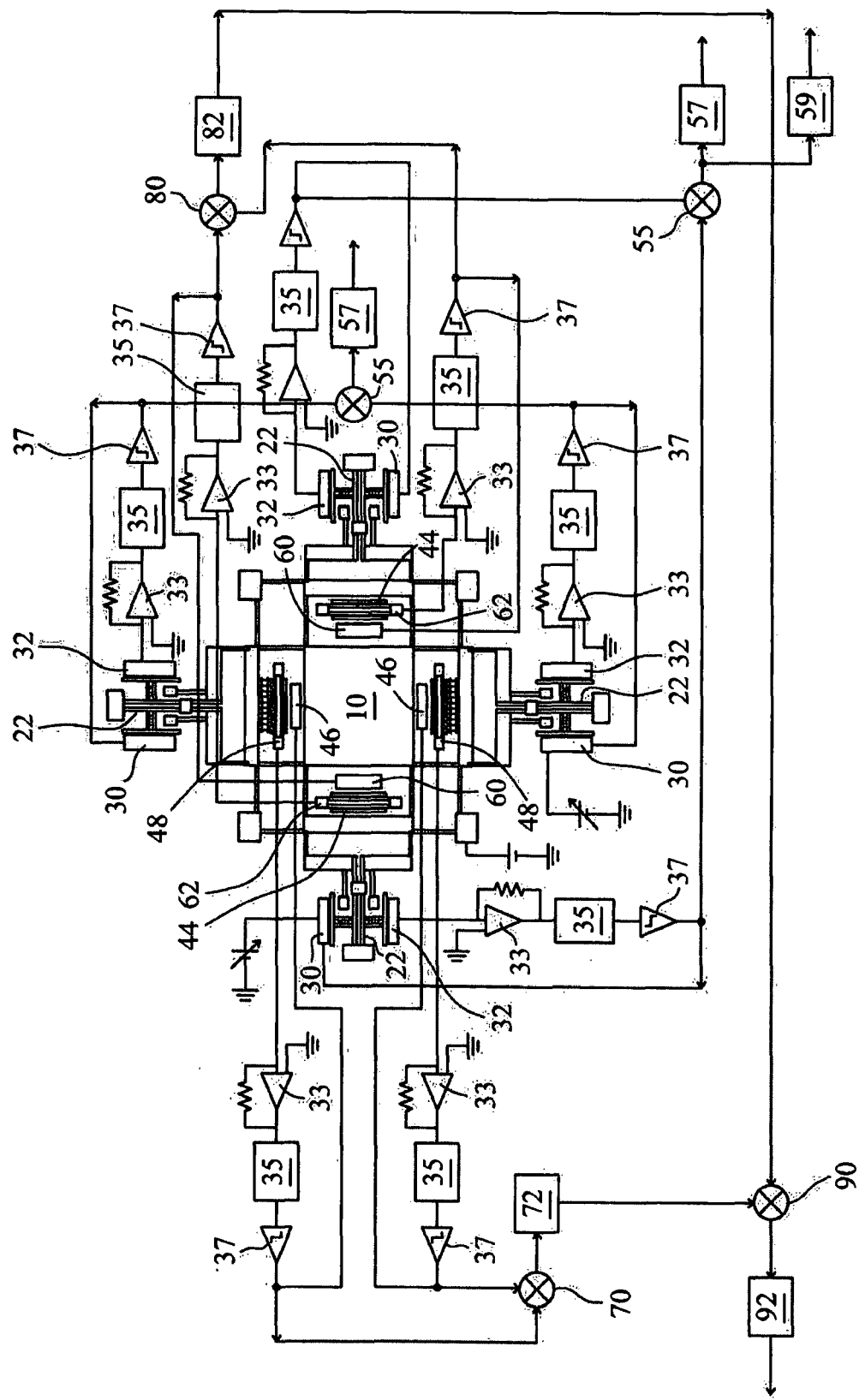
FIG. 4 is a schematic illustration of the drive and sensing electronics that may be used with the triple axis accelerometer shown in FIG. 3.

FIG. 4 illustrates one embodiment of readout electronics that can be used in conjunction with the triple axis accelerometer shown in FIG. 3.

The readout electronics required for X axis and Y axis accelerations are identical and so only the X axis readout will be described in detail. Each of the resonant elements 22 is driven by an alternating voltage applied to electrode 30. The frequency of oscillation of the resonator 22 is read out from electrode 32. Sustained oscillations are maintained using an oscillator circuit with automatic gain control, which feeds back into the drive electrode 30. The oscillator circuit includes a trans-resistance amplifier 33, a band pass filter 35 and a comparator 37.

Mixer 55 is used to provide a sum and difference of the outputs from diametrically opposed resonators 22. The output from the mixer 55 passes through a low pass filter 57 to provide the difference signal, which is an output proportional to the X axis acceleration.

As described above, an identical configuration is used to provide the Y axis output, and identical reference numerals have been used to label the electronic components for the Y axis.

A high pass filter may also be connected to the mixer 55 on either or both of the X axis and the Y axis output to provide a measure of temperature. FIG. 4 shows a high pass filter 59 connected to the Y axis output only. The high pass filter 59 removes the difference signal from the output of mixer 55 leaving only the sum signal (also referred to as the common mode output). In the common mode output, frequency shifts due to acceleration are cancelled out leaving an output sensitive predominantly to environmental factors, the most significant of which is temperature. In this way a single, machined silicon sensor can provide both acceleration and temperature outputs. The temperature measurement from high pass filter 59 may also be used to refine the acceleration measurement from low pass filter 57, as the acceleration measurement is still sensitive to any second order component of the relationship between resonant frequency and temperature.

The drive and sensing arrangement for the Z axis resonant elements is similar to that of the X and Y resonant elements. A drive signal is applied to drive electrodes 46, 60 and the output read from sense electrodes 48, 62, positioned at the base of the resonant elements. An oscillator circuit, including a trans-resistance amplifier, a band-pass filter and a comparator automatic gain control element, is used to sustain oscillation of the resonant elements 40, 42 and 50, 52.

Figure 5:
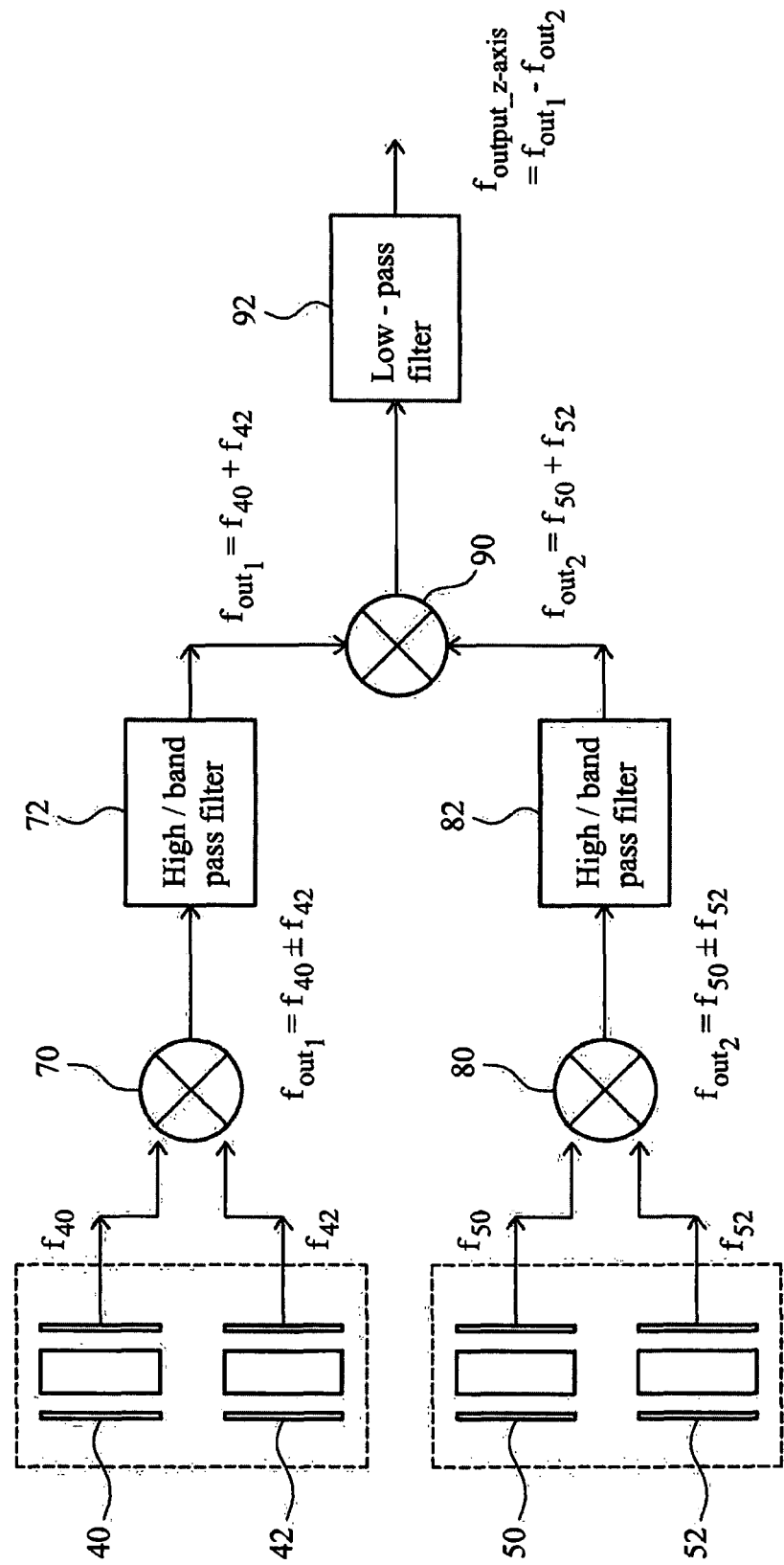
FIG. 5 illustrates the processing electronics used to derive a Z axis acceleration using the accelerometer illustrated in FIG. 3.

FIG. 5 illustrates the signal processing for the Z axis acceleration more clearly. Mixer 70 is used to provide the sum and difference of the outputs of the electrically coupled resonators 40, 42. The output from mixer 70 is subsequently high pass filtered by filter 72 to provide the sum signal. Similarly the outputs from the uncoupled resonators 50, 52 are summed and differenced by mixer 80 and high pass filtered by filter 82. Mixer 90 is used to provide a sum and difference signal from the outputs from filter 72 and filter 82. This output is filtered by low pass filter 92 to provide a frequency output proportional to the Z axis acceleration. Additional sense electrodes may also be incorporated to facilitate larger transduction area for each of the resonators, to consequently reduce motional resistance and improve the electronic noise limited resolution of the oscillator.

The sensitivity of the sensor of FIGS. 3 and 4 to Z axis acceleration depends on the stiffness of the resonant elements and of the proof mass flexures. Any displacement of the proof mass dual axis stage by a distance (Z) along the Z axis due to an acceleration $a_z$, results in an electrostatic modulation of the stiffness of each of the resonators that are electro-elastically coupled to the proof mass. This may be expressed as:

$$|\Delta k|_z = \left| \frac{(\Delta V^2)\varepsilon_0 (l(h-Z))}{(g)^3} \right| = \frac{(\Delta V^2)\varepsilon_0 l\left(h - \left(\frac{M_z a_z}{K_z}\right)\right)}{(g)^3}$$

Where $\Delta V$ represents the difference in potential between the stage and each of the resonators; $\varepsilon_0$ denotes the permittivity of air; l, the length of the capacitive coupling plates between the resonator and the dual axis stage platforms; h, the thickness of the platform; $M_z$ and $K_z$ represent the effective mass and stiffness of the proof mass along the Z axis and g, the capacitive coupling gap before any induced displacement of the proof mass/dual axis stage. The relative shift in the resonant frequency of each tuning fork resonator is then given by:

$$\left[\frac{\Delta f}{f^0}\right]_z \cong \frac{\Delta k_z}{2k}$$

Where k refers to the stiffness of the tuning fork at the mode of operation. Since the output corresponds to the summed component of the frequency shifts arising from two structurally identical resonators subtracted by the sum of the frequency shifts arising from two tuning forks that remain electrically decoupled to the motion of the proof mass, the net sensitivity along the Z axis may be expressed as:

$$\left[\frac{\Delta f}{f^0}\right]_{eff_z} \cong \frac{\Delta k_z}{k}$$

The scale factor of the device along the X and the Y axes can be written as a ratio of the nominal differential frequency shift between the two resonant tuning fork force sensors designed for acceleration readout along the X and the Y axes. This may be expressed as:

$$\left[\frac{\Delta f}{a_i}\right]_{i=X,Y} \cong \frac{A_i M S_i (f_0)_i}{4}$$

Where $A_i$ represents the net amplification factor of the mechanical force levers along the two orthogonal axes; $S_i = 0.293(L_i^2/Et_i w_i^3)$; $L_i$, the length of the tuning fork resonator along the sensitive axis; E, the Young's modulus, $t_i$ the thickness of the tuning fork resonator; $w_i$ the width of the tuning fork resonator; M the proof mass subjected to acceleration along the X and the Y axes; $a_i$ the acceleration input along the $i^{th}$ axis.

It should be clear that the embodiment shown in FIG. 4 is just one example of an accelerometer in accordance with the invention. It is possible to provide an accelerometer operating on the same principles using, among other things, a different shaped proof mass, a different flexure construction for the stage table, different positions for the fourth resonant elements, different types of resonant element, different positions for the drive and sense electrodes for each resonant element and different oscillator circuits.

It should also be clear that the idea of providing a temperature measurement from the common mode output of a pair of resonant elements couple d to opposite sides of a single proof mass may be applied or a single-axis or dual-axis accelerometer design, in the same manner as described with reference to FIG. 4.

Figure 6:
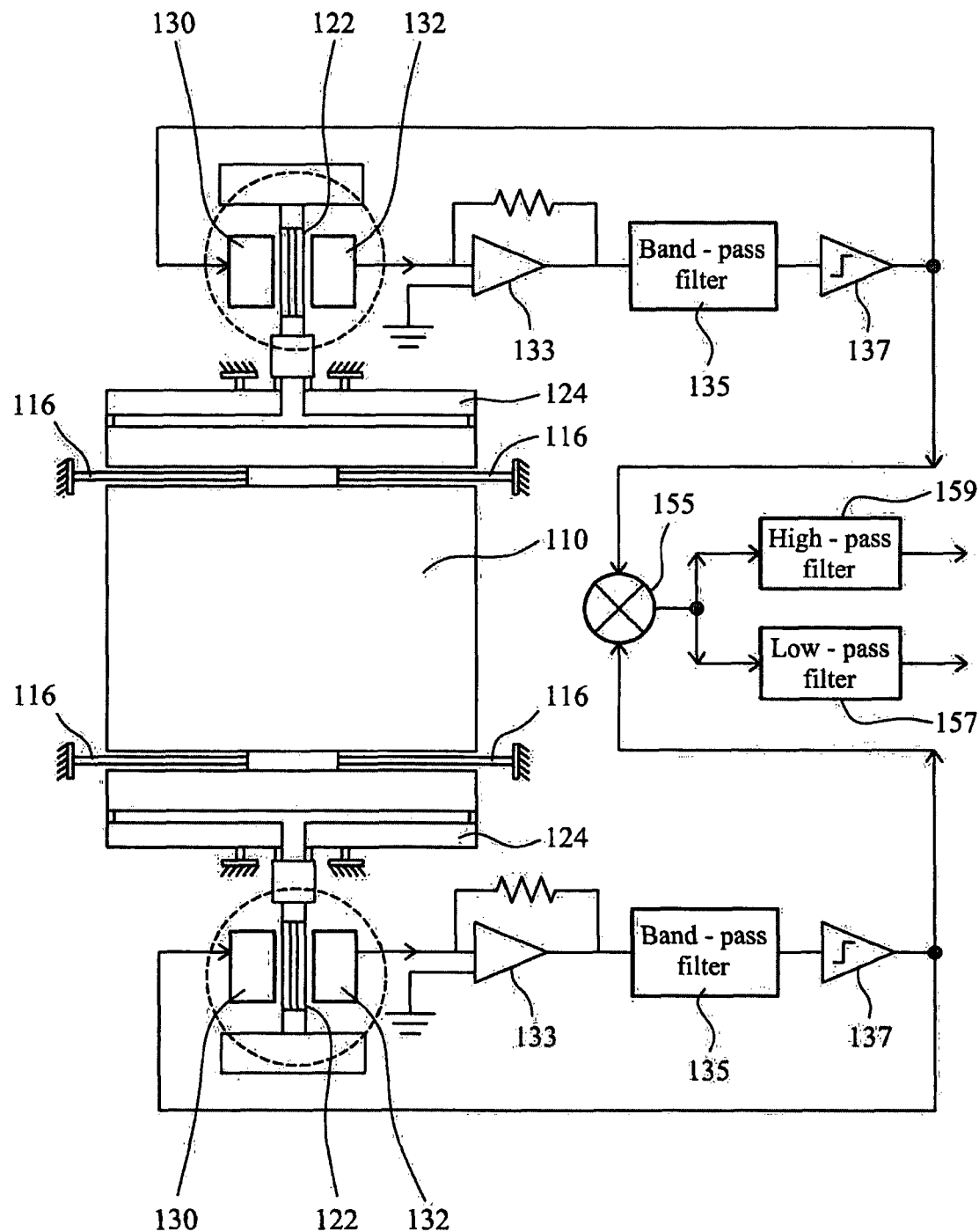
FIG. 6 is a schematic illustration of a sensor providing a single axis acceleration measurement and a temperature measurement, in accordance with the invention.

FIG. 6 is a schematic illustration of a single axis accelerometer with simultaneous temperature detection. A silicon proof mass 110 is suspended from a frame by flexures 116. A pair of resonant elements 122 is mounted on opposite sides of the proof mass, each mechanically coupled to the proof mass by force amplifying microlevers 124. The resonant elements 122 are driven by an alternating voltage applied to electrode 130. The frequency of oscillation of each resonator 122 is read out from corresponding electrode 132. Sustained oscillations are maintained using an oscillator circuit with automatic gain control, which feeds back into the drive electrode 130. The oscillator circuit includes a trans-resistance amplifier 133, a band pass filter 135 and a comparator 137, as described with reference to FIG. 4.

Mixer 155 is used to provide the sum and difference of the outputs from the opposed resonant elements 122. The output from the mixer 155 passes through a low pass filter 157 to provide the difference signal. Any change in resonant frequency due to movement of the proof mass 110 in the axis of sensitivity will be equal for each resonant element, but of opposite polarity. Changes in resonant frequency due to temperature changes will be equal for both resonant elements and of the same polarity. So the difference signal will provide an output which is proportional to the acceleration. A high pass filter 159 is also connected to the mixer. The high pass filter 159 removes the difference signal from the output of mixer 155 leaving only the summed output. In the summed output, frequency shifts due to acceleration are cancelled out leaving an output sensitive to temperature.

In this way a single, machined silicon sensor can provide both acceleration and temperature outputs. As described with reference to FIG. 4, the temperature measurement from high pass filter 159 may also be used to refine the acceleration measurement from low pass filter 157, as the acceleration measurement is still sensitive to any second order component of the relationship between resonant frequency and temperature.

In the embodiment of FIG. 6, the resonant elements 122 are mounted on opposite sides of the proof mass, each mechanically coupled to the proof mass by force amplifying microlevers 124. However, it should be clear that the resonant elements can be electrostatically coupled to the proof mass as an alternative. In the case of electrostatic coupling, displacement amplifiers may be used instead of force amplifying microlevers 124.

The invention claimed is:

1. An inertial sensor comprising:
a frame;
a proof mass suspended from the frame;
a pair of first resonant elements electrically coupled to the proof mass, or to an intermediate component mechanically coupled to the proof mass, each first resonant element coupled to an opposite side of the proof mass to the other, the first resonant elements being substantially identical to one another and having substantially identical electrostatic coupling with the proof mass when the sensor is not accelerating;
wherein the first resonant elements and proof mass lie substantially in a plane, and wherein movement of the proof mass relative to the first resonant elements orthogonal to the plane alters the electrostatic coupling between the proof mass and the first resonant elements;
drive means coupled to the first resonant elements for vibrating each of the first resonant elements; and
a sensor assembly for detecting a shift in the resonant frequency of each of the first resonant elements; and
processing means for summing the shifts of each of the first resonant elements to provide a measure of acceleration of the proof mass parallel to a first axis, the first axis being orthogonal to the plane.

2. An inertial sensor according to claim 1, further comprising a second resonant element coupled to the proof mass, the second resonant element configured to allow for detection of acceleration parallel to a second axis, orthogonal to the first axis;
wherein the drive means is coupled to the second resonant element for vibrating the second resonant element, and the sensor assembly detects a shift in the resonant frequency of the second resonant element.

3. An inertial sensor according to claim 2, wherein the second resonant element is mechanically coupled to the proof mass.

4. An inertial sensor according to claim 2, further comprising a third resonant element coupled to the proof mass, the third resonant element configured to allow for detection of acceleration parallel to a third axis, wherein the third axis is orthogonal to the first axis and the second axis;
wherein the drive means is coupled to the third resonant element for vibrating the third resonant element, and the sensor assembly detects a shift in the resonant frequency of the third resonant element.

5. An inertial sensor according to claim 4, wherein the third resonant element is mechanically coupled to the proof mass.

6. An inertial sensor according to claim 4, comprising a pair of third resonant elements each third resonant element positioned on an opposite side of the proof mass to the other, the third resonant elements being identical to one another.

7. An inertial sensor according to claim 6, wherein both a common mode and a differential mode output is read from the pair of third resonant elements, the common mode output providing a measure of temperature and the differential output providing a measure of acceleration.

8. An inertial sensor according to claim 2, comprising a pair of second resonant elements each second resonant element positioned on an opposite side of the proof mass to the other, the second resonant elements being identical to one another.

9. An inertial sensor according to claim 1 further comprising a mechanical stage between the proof mass and the frame, the mechanical stage configured to decouple movement of the proof mass in two orthogonal directions in the plane, wherein the second or third resonant elements, or both the second and third resonant elements, are mechanically coupled to the mechanical stage.

10. An inertial sensor according to claim 1, further comprising a fourth resonant element, wherein the fourth resonant element is substantially identical to the first resonant elements and is not electrically coupled to the proof mass.

11. An inertial sensor according to claim 1, further comprising a least one amplifying lever coupled between the proof mass or mechanical stage and one of the first, second and third resonant elements to mechanically amplify the communicated force.

12. An inertial sensor comprising: a frame; a mechanical stage suspended from the frame, a proof mass suspended from the mechanical stage, the mechanical stage operative to decouple movement of the proof mass in two orthogonal directions; a first resonant element coupled to a first portion of the mechanical stage, the first portion of the mechanical stage free to move parallel to a first axis; a second resonant element coupled to a second portion of the mechanical stage, the second portion of the mechanical stage free to move parallel to a second axis, the second axis being orthogonal to the first axis; drive means coupled to the resonant elements for vibrating each of the resonant elements; and a sensor assembly for detecting a shift in the resonant frequency of each of the first and second resonant elements.

13. An inertial sensor according to claim 12, further comprising a least one displacement amplifying lever coupled between the mechanical stage and one of the first and second resonant elements.

14. An inertial sensor according to claim 12, comprising a pair of first resonant elements, each of the first resonant elements disposed on opposite sides of the mechanical stage.

15. An inertial sensor according to claim 14, comprising a pair of second resonant elements, each of the second resonant elements disposed on opposite sides of the mechanical stage.

16. An inertial sensor according to claim 14, wherein both a common mode and a differential mode output is read from the pair of first resonant elements or from the pair of second resonant elements, the common mode output providing a measure of temperature and the differential output providing a measure of acceleration.

17. An inertial sensor according to any one of claim 12, further including a least one third resonant element electrostatically coupled to the proof mass or mechanical stage, wherein acceleration of the proof mass in a direction orthogonal to the first and second axes alters the electrostatic coupling between the third resonant element and the proof mass or mechanical stage.

18. An inertial sensor comprising: a frame; a proof mass suspended from the frame; a pair of first resonant elements coupled to the proof mass, or to an intermediate component coupled to the proof mass, each first resonant element coupled to an opposite side of the proof mass to the other, the first resonant elements being substantially identical to one another and having substantially identical coupling with the proof mass when the sensor is not accelerating; wherein movement of the proof mass towards or away from the first resonant elements alters the effective stiffness of the first resonant elements; drive means coupled to the first resonant elements for vibrating each of the first resonant elements; a sensor assembly for detecting a shift in the resonant frequency of each of the first resonant elements; and processing means to sum the shifts of each of the first resonant elements to provide a measure of temperature.

19. An inertial sensor according to claim 18, wherein the processing means is configured to provide a difference between the shifts of each of the first resonant elements to provide a measure of acceleration in one direction.

20. An inertial sensor according to claim 19, wherein the processing means comprises a mixer having an input connected to the sensor assembly and an output connected to a first filter and a second filter, the first filter configured to provide a sum of the shifts of each of the first resonant elements to provide the measure of temperature, the second filter configured to provide a difference.

* * * * *